(12) United States Patent
MacKay

(10) Patent No.: US 6,920,084 B2
(45) Date of Patent: Jul. 19, 2005

(54) OFFSET TRANSFORMATION TO ZERO DIP THAT PRESERVES ANGLE OF INCIDENCE

(75) Inventor: Scott W MacKay, Englewood, CO (US)

(73) Assignee: Western Geco, L.L.C., Houston, TX (US)

(*) Notice: Subject to any disclaimer, the term of this patent is extended or adjusted under 35 U.S.C. 154(b) by 346 days.

(21) Appl. No.: 10/342,698

(22) Filed: Jan. 15, 2003

(65) Prior Publication Data

US 2004/0136269 A1 Jul. 15, 2004

(51) Int. Cl.$^7$ .............................. G01V 1/00; G01V 1/28
(52) U.S. Cl. .............................. 367/53; 367/51; 367/59; 702/14
(58) Field of Search .............................. 367/51, 53, 59; 702/14

(56) References Cited

U.S. PATENT DOCUMENTS

| | | | | | |
|---|---|---|---|---|---|
| 4,393,484 A | * | 7/1983 | Buchanan et al. | ............ | 367/23 |
| 4,878,205 A | * | 10/1989 | Gelchinsky | ................. | 367/61 |
| 4,992,996 A | * | 2/1991 | Wang et al. | .................... | 367/53 |
| 5,394,325 A | * | 2/1995 | Schneider, Jr. | ................ | 702/18 |
| 5,629,904 A | * | 5/1997 | Kosloff et al. | ................ | 367/53 |
| 5,677,893 A | * | 10/1997 | de Hoop et al. | ............... | 367/50 |
| 5,764,514 A | | 6/1998 | Raynaud et al. | ............ | 364/420 |
| 6,094,621 A | * | 7/2000 | Hanitzsch et al. | ............ | 702/16 |
| 6,272,435 B1 | | 8/2001 | Ohanian | ...................... | 702/18 |
| 6,470,276 B1 | * | 10/2002 | Lansley et al. | ................ | 702/16 |
| 6,546,339 B2 | * | 4/2003 | Bevc et al. | .................... | 702/18 |
| 6,687,618 B2 | * | 2/2004 | Bevc et al. | .................... | 702/14 |
| 6,691,075 B1 | * | 2/2004 | Winbow et al. | ................ | 703/2 |
| 2002/0161525 A1 | * | 10/2002 | Wisecup | ...................... | 702/14 |
| 2003/0208321 A1 | * | 11/2003 | Martinez et al. | .............. | 702/14 |

FOREIGN PATENT DOCUMENTS

WO    WO 97/13213    4/1997

OTHER PUBLICATIONS

Alkhalifah, Tariq. "Seismic data processing in vertically inhomogeneous TI media." Geophysics, vol. 62 No. 2 (Mar.–Apr. 1997) p. 662–675.*

Sarkar, Debashish and Tsvankin, Ilya. "Analysis of image gathers in factorized VTI media." CWP–406.*

Alkhalifah, Tariq. "Acoustic approximatoins for processing in transversely isotropic media." Geophysics, vol. 63 No. 2 (Mar.–Apr. 1998) p. 623–631.*

Sarkar and Tsvankin. "Migration velocity analysis in factorized VTI media."*

MacKay and Abma. "Imaging and velocity estimation with depth focusing analysis." Geophysics, vol. 57 (Dec. 1992) pp. 1608–1622.*

Sherrill, F., Charles, S., Woodward, M. and Sengupta, M., 2001, Improving AVO and Reflection Tomography Through Use of Local Dip and Azimuth, 71$^{st}$ Ann. Internat. Mtg: Soc. Of Expl. Geophys., 273–276.

International Search Report dated Apr. 27, 2004 (PCT/US03/36738;2086.002410).

Bleistein, et al.: "True–amplitude transformation to zero offset of data from curved reflectors"; GEOPHYSICS, vol. 64, No. 1, pp. 112–129, Jan.–Feb. 1999.

* cited by examiner

Primary Examiner—Thomas H. Tarcza
Assistant Examiner—Scott A. Hughes
(74) Attorney, Agent, or Firm—Western Geco, L.L.C.

(57) ABSTRACT

A method and apparatus for compensating acquired seismic data for the presence of dipping events are disclosed. The method includes migrating the acquired, unstacked seismic data; and spatially mapping the migrated seismic data to correct their respective offsets while maintaining the angle of incidence to a dipping event. The method may be performed by a programmed computing device or encoded as instructions for a computing device on a program storage medium.

24 Claims, 4 Drawing Sheets

OFFSET TRANSFORMATION TO ZERO DIP THAT PRESERVES ANGLE OF INCIDENCE

BACKGROUND OF THE INVENTION

1. Field of the Invention

The present invention pertains to the processing of acquired seismic data, and, more particularly, to a method and apparatus for preconditioning seismic data to impart an offset transformation to zero dip that preserves angle of incidence.

2. Description of the Related Art

Seismic surveying traditionally involves imparting acoustic waves from an acoustic source that propagate through subterranean geological formations and are reflected back to seismic sensors. The seismic sensors are arrayed throughout the area being surveyed. The reflected signals are transformed into electrical or optical signals that are then transmitted to a data collection unit. In a land-based survey, the data collection unit is usually housed on a recording truck. In a marine survey, the data collection typically occurs on a survey vessel. The data collection unit either records the signals it receives, analyzes them in real-time, transmits them to a remote location for analysis, or some combination of these things.

The acquired data is then processed in an effort to yield information regarding the location of hydrocarbon or other mineral deposits. More particularly, the data is typically processed to improve the accuracy of the information that can be extracted from it. Data processing techniques, such as "prestack migration," "poststack migration," "full prestack waveform inversion," and "offset-to-angle transformation," are frequently applied. Still other techniques are known to the art.

However, the complexity of the geological formation's structure can impair the accuracy of these techniques. Many, if not most, processing techniques assume there are no structural dips in the reflectors of the geological formation, i.e., the reflector lies entirely within a horizontal plane relative to the surface. Among the techniques assuming no structural dips are conventional "offset-to-angle conversion" and "full prestack waveform inversion."

Many of these techniques use the seismic amplitudes of the reflected signals to estimate physical properties of the earth such as P-wave velocity, S-wave velocity, and density. A key factor affecting seismic amplitudes is the angle of incidence of rays as they encounter and are reflected from geologic events. Misrepresentations of incidence angles, such as those that will occur with zero-dip techniques in the presence of structural dip, will contaminate the estimation of the earth properties. Although some techniques may be altered to incorporate structural dip, many can only do so approximately, or not at all.

The art has recognized this problem. See Sherrill, F., et al., "Improving AVO and Reflection Tomography Through Use of Local Dip and Azimuth," $71^{st}$ Ann. Internat. Mtg: Soc. of Expl. Geophys., 273–276 (2001). The article discusses the errors incurred by ignoring structural dip when performing offset-to-angle transformations and reflection tomography. Sherrill et al., started with prestack migrated data (time or depth) to ensure that the data are focused to their proper subsurface locations. A reflector dip field is then derived from the prestack migrated data. From the dip field, ray tracing is used to calculate the angles of incidence from the dipping reflector prior to mapping to the angle domain. This method involves altering zero-dip offset-to-angle transform code to address the effects of structural dip. However, many algorithms may require drastic alteration to incorporate structural dip. In other cases, such corrections may not be theoretically or computationally feasible.

The present invention is directed to resolving, or at least reducing, one or all of the problems mentioned above.

SUMMARY OF THE INVENTION

A method and apparatus for compensating acquired seismic data for the presence of dipping events are disclosed. The method includes migrating the acquired, unstacked seismic data; and spatially mapping the migrated seismic data to correct their respective offsets while maintaining the angle of incidence to a dipping event. The method may be performed by a programmed computing device or encoded as instructions for a computing device on a program storage medium. The apparatus comprises at least one seismic source capable of imparting a plurality of seismic signals into a geological formation; a recording array capable of receiving reflections of the seismic signals from the geological formation and generated seismic data therefrom; a data collection unit capable of collecting seismic data generated by the recording array for analysis; and a computing device programmed to perform a method for processing the acquired data to transform a plurality of offsets to a zero-dip position while maintaining the respective angle of incidence for each of the offsets.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

The present invention comprises a method and apparatus for preconditioning a set of seismic data to impart an offset transformation to zero dip that preserves angle of incidence. Note that the invention can be applied to seismic data that is actually zero-dip. However, as a practical matter, only rarely will a set of seismic data be zero-dip.

Figure 1:
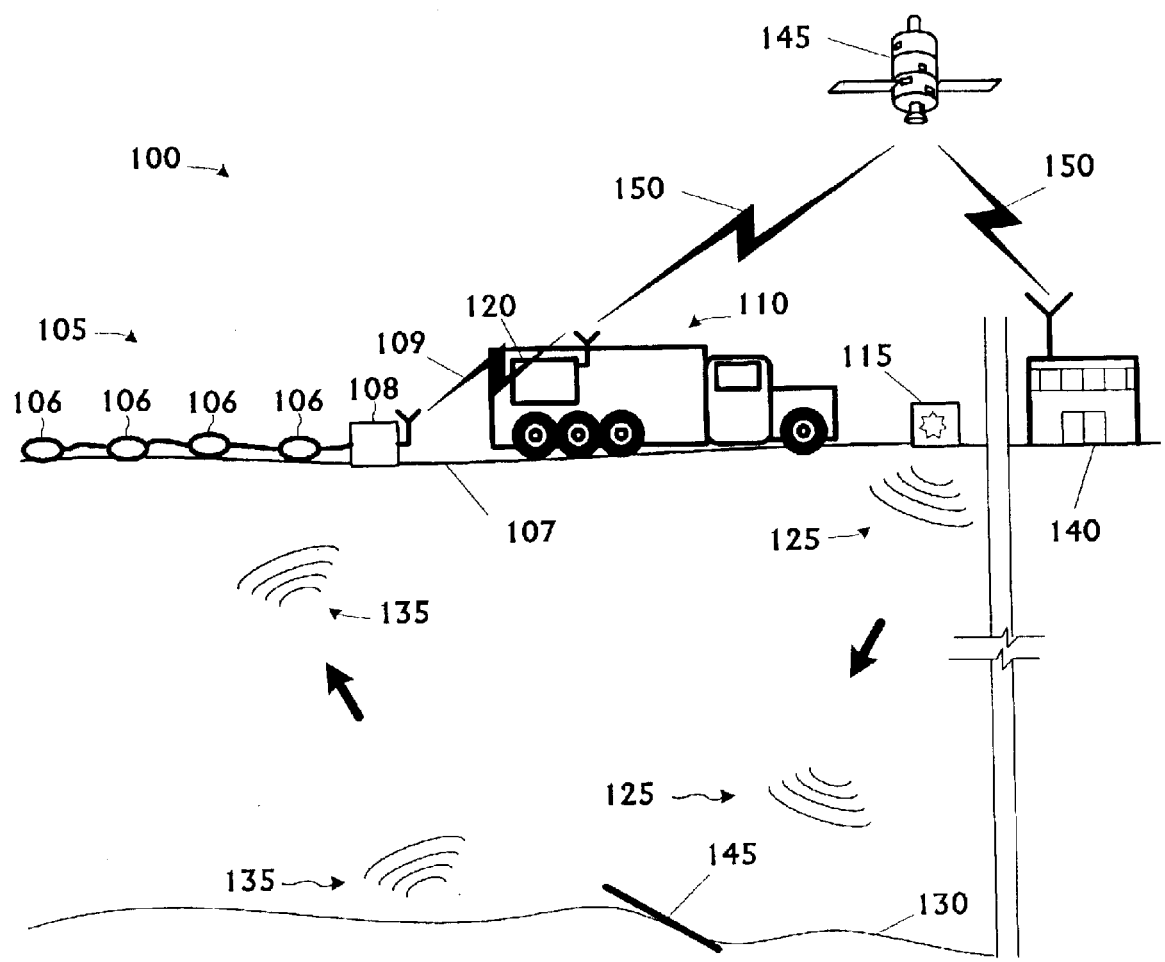
FIG. 1 conceptually illustrates a land-based seismic survey in accordance with one particular embodiment of the present invention.

FIG. 1 illustrates a land-based seismic survey employing a seismic survey system 100 by which seismic data may be acquired for processing in accordance with the present invention. Note that the present invention may also be applied in the context of a marine survey and is not limited to land-based surveys. Furthermore, the invention may be employed with P-wave surveys, P–S (or, "converted")-wave surveys, and S-wave surveys. The invention also may be used with any acquisition geometry. The invention is not limited by these aspects of any given embodiment.

The seismic survey system 100 includes a seismic recording array 105 and may be constructed in accordance with conventional practice. The recording array 105 includes a plurality of receivers 106 positioned about an area to be surveyed on the surface 107. Each receiver 106 in the illustrated embodiment is associated with a transmitter 108 capable of wirelessly transmitting data collected by the receivers 106, as indicated by the wireless link 109. The receivers 106 are implemented, in the illustrated embodiment, with, e.g., conventional geophones as are known to the art. Note that, in some alternative embodiments, the recording array 105 may transmit data collected by the receivers 106 over a wired connection.

FIG. 1 shows a seismic source 115 and a data collection unit 120 centrally located on the recording truck 110. However, as will be appreciated by those skilled in the art, various portions of the data collection unit 120 may be distributed in whole or in part, e.g., across the seismic recording array 105, in alternative embodiments. The seismic source 115 generates a plurality of seismic survey signals 125 in accordance with conventional practice. The seismic survey signals 125 propagate and are reflected by the subterranean geological formation 130. The seismic data sources 120 receive the reflected signals 135 off the geological formation 130 in a conventional manner. The seismic receivers 106 then generate data representative of the reflections 135, and the seismic data is embedded in electromagnetic signals. Note that the geological formation 130 presents a dipping event 145 to the seismic signals 125.

Figure 2A:
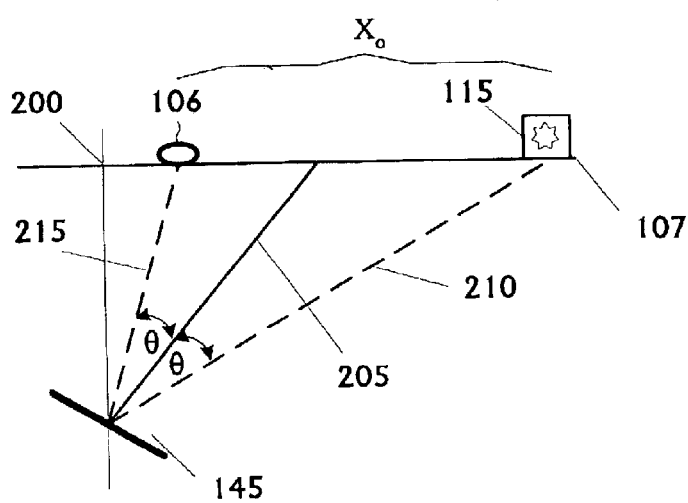
FIG. 2A and FIG. 2B graphically illustrate the desired transformation from the original offset from a dipping event in FIG. 2A with an angle incidence to a corrected offset with a zero-dip and the same angle of incidence as in FIG. 2A upon application of the present invention.
Figure 2B:
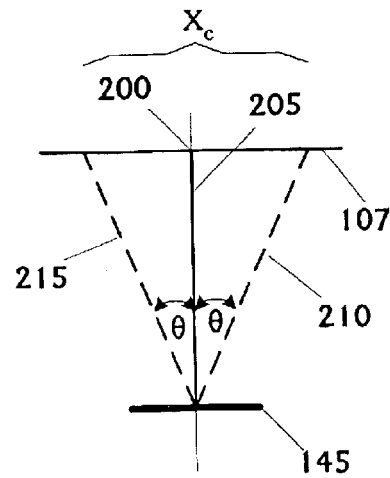

FIG. 2A and FIG. 2B illustrate, in an idealized fashion, several concepts of the survey described immediately above pertinent to the present invention. FIG. 2A shows the ray geometry (dashed) for a particular offset, $X_o$, in the case of a dipping reflector, e.g., the dipping event 145, at the image gather point 200. Also shown is the normal-incidence (zero-offset) ray 205. The angle of incidence θ is defined between the normal ray 205 and the incident and reflected rays 210, 215 for the particular offset $X_o$. The incident angle θ is equal for incidence and reflection in accordance with Snell's Law. For simplicity, FIG. 2A shows a special case where the acquisition azimuth, defined as the direction between the source 115 and the receiver 106, is parallel to structural dip, i.e., the dipping event 145.

This zero acquisition azimuth case shown in FIG. 2A is illustrative and not necessarily representative. Acquisition azimuths must be accounted for along with structural dip and strike. The acquisition azimuth may be determined by:
  using a constant-azimuth assumption;
  azimuth vs. offset, based on the normal ray location; or
  full azimuth binning.

The constant-azimuth assumption is mainly used for marine surveys employing towed cables. In such embodiments where there is significant feathering, the dominant azimuth is extracted as a function of offset for each normal (zero-offset) ray position. In acquisition geometries where there is no dominant azimuth, (e.g., most land and ocean bottom cable ("OBC") surveys), full azimuth binning may be employed. This involves sorting the data into azimuth, as well as offset bins, either before, or as part of the migration process. The decision to bin before or after the migration depends on whether the embodiment operates on the full volume (amplitude variation of offset, or "AVO"), or a coarse grid (tomography). Still other suitable techniques known to the art may be employed.

FIG. 2B shows the desired, calculated ray geometry after application of the present invention for the same time (or depth), except with zero dip. The same angle of incidence θ shown in FIG. 2A is traced to the surface 107. The offset transformation to zero dip may now be described. For a particular event, the angle of incidence θ is fixed and the offsets are mapped from the original dipping case to the corrected zero-dip case. In the case shown here, the data in the migrated gather at the original offset, $X_o$, in FIG. 2A is mapped to a new offset, $X_c$, as shown in FIG. 2B. Each prestack migrated image gather is corrected independently and the mapping is applied to all times (time migration) or depths (depth migration) and to all original offsets $X_o$. Table 1 illustrates the mapping. Starting at the shallowest time (or depth), in this case time $T_1$, incidence angles θ are established and rays traced to the surface 107. The original offset $X_o$ corresponding to the dipping case 145 is recorded. For the same time $T_1$, rays are traced to the surface 107, with zero dip (a horizontal event) and the corrected offsets $X_c$ are recorded. This is done for a series of times (or depths) until the maximum value of interest is reached. The correction is a movement of the data, starting at time $T_1$, from the original offset $X_o$ to the corrected offset $X_c$. This is done for all times.

TABLE 1

| Offset Corrections | | |
|---|---|---|
| θ | $X_o$ | $X_c$ |
| $T_1$ or $D_1$ | | |
| 10° | 1000 m | 900 m |
| 20° | 2000 m | 1800 m |
| 30° | 3000 m | 2700 m |
| $T_2$ or $D_2$ | | |
| 10° | 1500 m | 1100 m |
| 20° | 2500 m | 2200 m |
| 30° | 3500 m | 3300 m |

Returning to FIG. 1, as described above, the signals generated by the receivers 106 are communicated to the data collection unit 120. More particularly, the seismic receivers 106 communicate the seismic data they collect to the data collection unit 120 over the wireless link 109 through the transmitter 108. The data collection unit 120 collects the seismic data for processing. The data collection unit 120 may process the seismic data itself, store the seismic data for processing at a later time, transmit the seismic data to a remote location for processing, or some combination of these things. In the illustrated embodiment, the data collection unit 120 transmits the seismic data to a fixed-base facility 140 via a satellite 145 and the satellite links 150, although this is not necessary to the practice of the invention. Ultimately, in accordance with the present invention, the data collected by the seismic receivers 106 is transmitted to a central facility or location. This central facility may be a computing and storing center ("CSC"), e.g., the recording truck 110 or the fixed-base facility 140. Note that some alternative embodiments may employ multiple data collection systems 120.

Figure 3A:
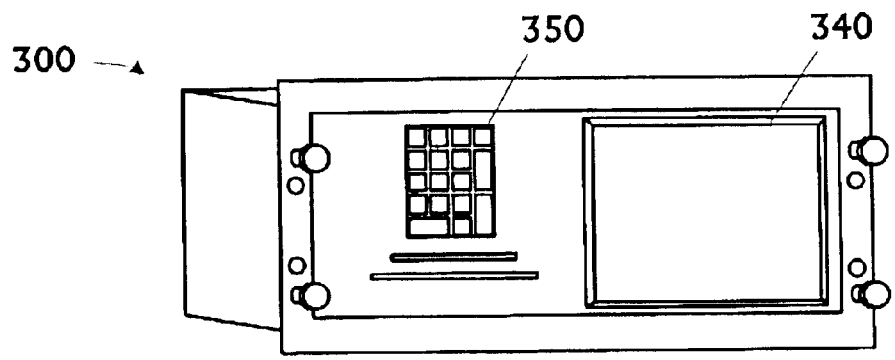
FIG. 3A and FIG. 3B conceptually illustrate a data collection unit as may be used in the embodiment of FIG. 1.
Figure 3B:
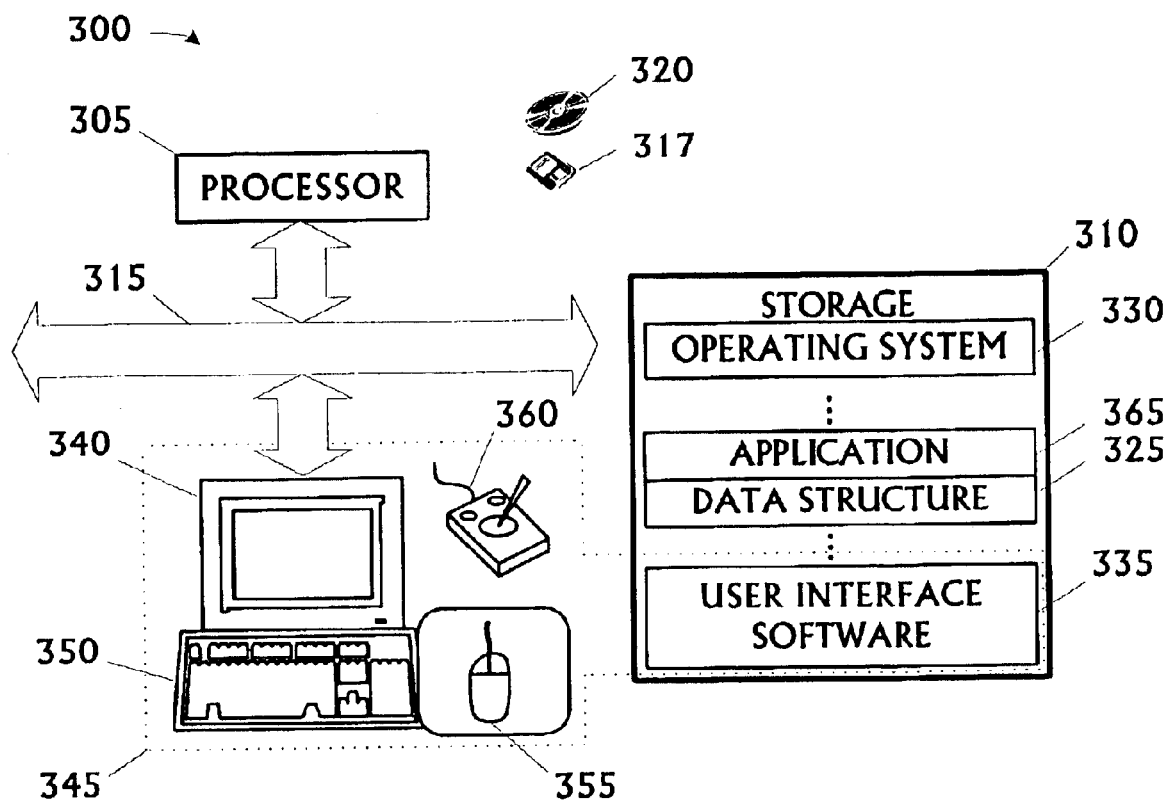

The recording truck 105 is equipped with a rack-mounted computing apparatus 300, illustrated in FIG. 3A and FIG. 3B, with which at least a portion of data collection system 120 is implemented. The computing apparatus 300 includes a processor 305 communicating with some storage 310 over a bus system 315. The storage 310 may include a hard disk and/or random access memory ("RAM") and/or removable storage such as a floppy magnetic disk 317 and an optical disk 320. The storage 310 is encoded with a data structure 325 storing the data set acquired as discussed above, an operating system 330, user interface software 335, and an application 365. The user interface software 335, in conjunction with a display 340, implements a user interface 345. The user interface 345 may include peripheral I/O devices such as a key pad or keyboard 350, a mouse 355, or a joystick 360. The processor 305 runs under the control of the operating system 330, which may be practically any operating system known to the art. The application 365 is invoked by the operating system 330 upon power up, reset, or both, depending on the implementation of the operating system 330.

Returning again to FIG. 1, the geological formation 130 presents a dipping event 145. As those in the art having the benefit of this disclosure will appreciate, geological formations under survey will typically be much more complex. For instance, multiple reflectors presenting multiple dipping events 145 may be present. FIG. 1 omits these additional layers of complexity for the sake of clarity and so as on to obscure the present invention. The invention may nevertheless be practiced in the presence of such complexity.

Figure 4:
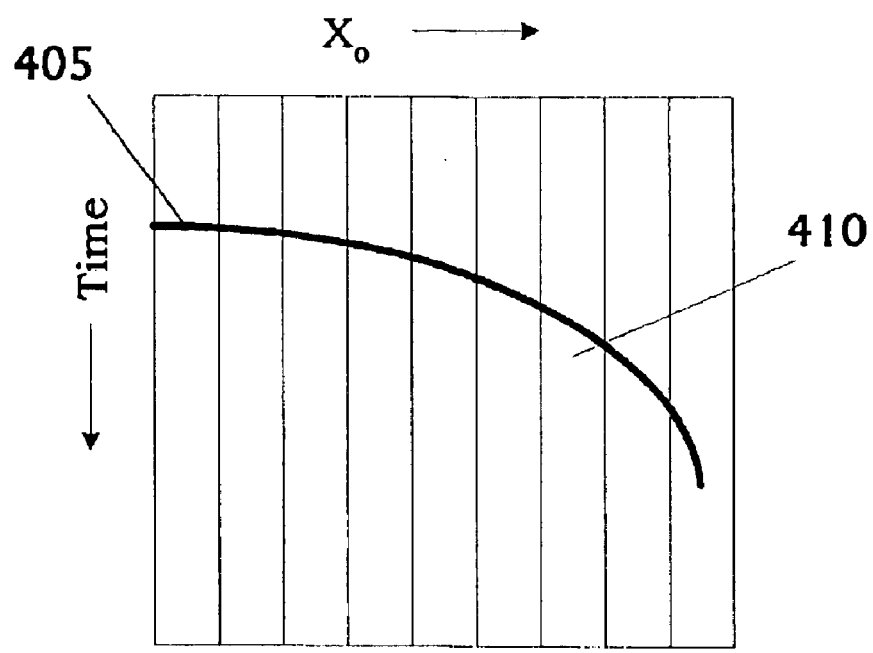
FIG. 4 conceptually illustrates a two-dimensional image of the seismic data acquired as illustrated in FIG. 1 with the original offsets reflecting the dipping event shown in FIG. 1.

The seismic data set acquired as discussed above relative to FIG. 1 is stored in the data structure 325, shown in FIG. 3B, and includes the effects of the dipping event 145, first shown in FIG. 1. FIG. 4 conceptually illustrates a two-dimensional image of the acquired seismic data set, with each vertical line representing an offset in the recording array 105 between a receiver 106 and seismic source 115. The line 405 represents the interface of the geologic formation 130 that reflects the seismic signals 125. Note the curve 410 in the line 405 representing the dipping event 145. Note that the offsets are "original offsets," i.e., measured and not yet corrected for the dipping event 145.

Figure 5A:
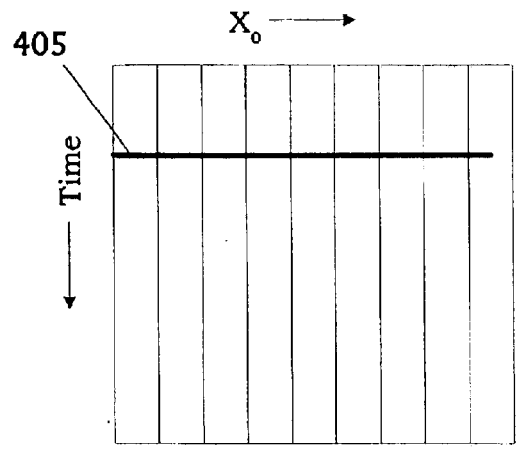
FIG. 5A–FIG. 5C graphically illustrate the spatial mapping effecting the transformation first shown in FIG. 2A–FIG. B.

A prestack migration is then performed on the acquired seismic data to migrate the acquired seismic data prior to correcting their subsurface locations. The acquired seismic data set may be migrated in time or in depth, depending on the particular implementation. Prestack migration techniques in both the time and depth domains are well known to the art, is and any suitable technique may be employed. The data in the image gathers are now in their proper spatial locations, and the reflection from a particular geologic event is horizontal with offset. The prestack migration yields flat events with offset, as is shown in FIG. 5A. Note that, in FIG. 5B, the line 405 is straight—a consequence of the flattening. Note also that the offsets are still "original," i.e., uncorrected for the dipping event 145 and still retain information pertaining to the angle of incidence θ.

The flattened, migrated data may also be analyzed to yield information useful in determining the actual angles of incidence θ for each offset. The images provided by the prestack migrated data are separately analyzed, using tools well known in the industry, to yield an estimate of the strike and dip of the seismic events. The acquisition geometry is also known, yielding a dominant acquisition azimuth as discussed above, or each azimuth volume may be processed separately. Given the reflector structural orientation, the acquisition geometry (azimuth), and the migration velocity field, it is possible to perform ray tracing from the reflector to the acquisition geometry to yield the angle of incidence for the dipping events.

The migrated image also allows the dip and strike of the seismic events to be defined via a separate analysis step. More particularly, the dip field can be extracted from:

a poststack depth-migrated volume;

a set of interpreted horizons; or a set of patches of common image point ("CIP") gathers. Theoretically, only the last approach is valid because it maintains the consistency between the picked event and the associated dip. However, the two other approaches can be used as an approximation when the generation of CIP patches is not affordable or if the data quality become too poor. When the stack assumption is violated, and the data quality is very poor (near and below a salt body, for instance), the use of interpreted horizons becomes the only alternative to estimate the dip field.

It will also typically be desirable to remove other potential sources of distortion for algorithms that assume zero structural dip. For example, the migrated data in FIG. 5A, after prestack time migration, may still have residual moveout caused by unresolved velocity or anisotropic effects. These may be removed by flattening the data along offset using methods well known in the industry such as non surface-consistent statics. These steps of preconditioning are very similar to those commonly used prior to conventional offset-to-angle conversion mentioned above.

The migrated data is then spatially mapped to correct their respective offsets while maintaining the angle of incidence to the dipping event 145. More particularly, a spatial correction is applied to the migrated seismic data to place the migrated seismic data with its original offsets to a corrected offset position for the same angles of incidence θ with zero dip. With the information (e.g., the dipping event 145) extracted from the migrated data as discussed above, a ray tracing is performed throughout the acquisition geometry to determine the angles of incidence for each offset. From the angles of incidence, corrected offsets can be determined. The geometry in FIG. 2A may be used to define a correction that maps the original offsets $X_o$ to their zero-dip equivalent, corrected offset $X_c$ while preserving the angle of incidence θ. The strike and dip estimates, combined with the migration velocity field and the acquisition azimuth, allow commonly practiced ray-tracing approaches to reconstruct the (dashed) ray geometry in FIG. 2A. From this information the angles of incidence (illustratively shown for just one event) may be calculated for all offsets.

The shift is the difference between $X_o$ and $X_c$. Basically, for a particular time (or depth) a ray is traced to the surface from the dipping event while bookkeeping the angle-of-incidence θ. This is done for a range of angles-of-incidence θ spanning from zero to, for example, 70°. This represents the range that may typically be encountered in seismic data. With this information, an incidence angle θ for each offset may be implied. Note that this technique may not exactly trace to an offset of interest, and may instead interpolate the angles between the offsets traced to the surface. Next, the same ray tracing is performed for the same time (or depth) for a flat event (zero dip). The offsets that relate to the same span of angle-of-incidence are book kept. This leads to Table 1 showing the span of incidence angles and the offsets for the dipping case and the flat case. The (horizontal) spatial correction along offset is a shift from $X_o$ to $X_c$. Note that $X_o$ is typically larger than $X_c$. Therefore, the shift is typically towards smaller offsets. Also, the greater the original offset $X_o$, the larger the shift. In this regard, it is a dynamic shift, thus the arrows are larger at greater offsets. The above is performed at all times (or depths).

Figure 5B:
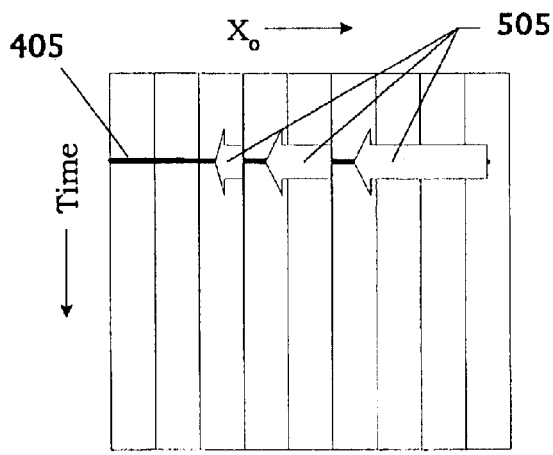
Figure 5C:
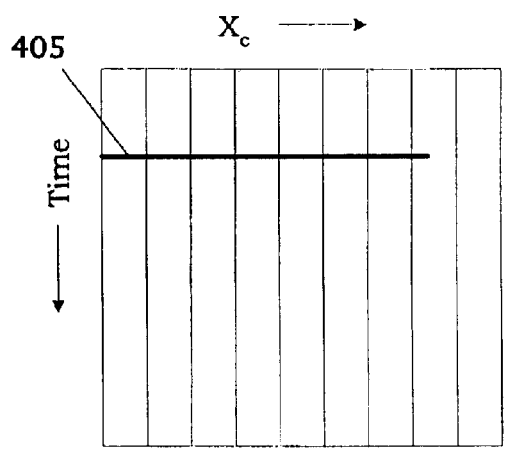

FIG. 5A illustrates the data from the image gather location shown in FIG. 2A after prestack time migration. FIG. 5B shows three arrows 505 that indicate the lateral movement to be applied, as implied by Table 1, for the reflector at Time 1 (or depth $D_1$). FIG. 5C shows the data after applying the spatial corrections to the new $X_c$ offset positions.

Figure 6:
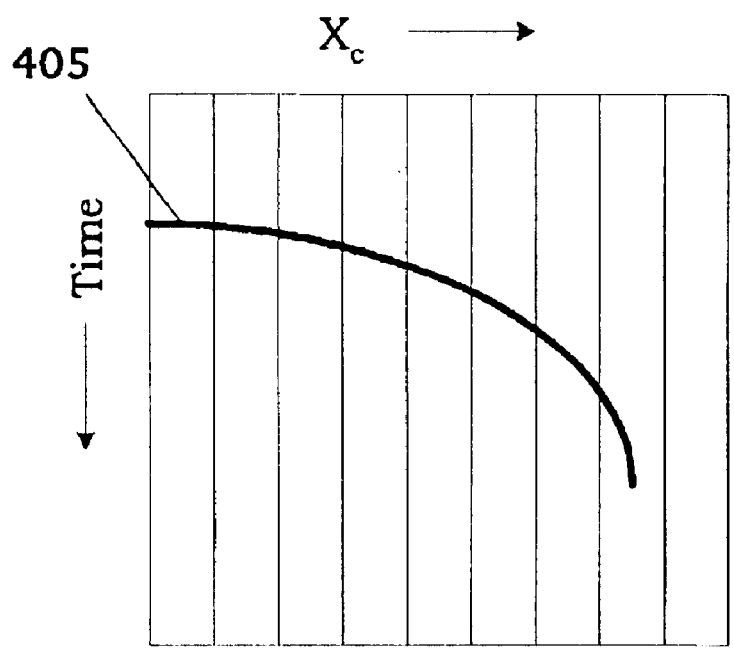
FIG. 6 conceptually illustrates the data set of FIG. 5C after application of inverse normal moveout in one particular embodiment.

Once the offset transformation has been performed, the data may be used in conventional zero-dip assumption techniques, e.g., an offset-to-angle conversion algorithm, as are commonly employed in the industry. Note that the data, after the spatial mapping, is still flattened, as is shown in FIG. 5C. As those in the art having the benefit of this disclosure will appreciate, some processing techniques do not employ flattened data. For example, for full waveform inversion, the data must not have a normal moveout ("NMO") correction applied. Therefore, the next step would be to apply inverse normal moveout ("INMO") using the zero-dip travel time solution used the calculation for angle of incidence, as shown in FIG. 6.

Some portions of the detailed descriptions herein are presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for compensating acquired seismic data for the presence of a dipping event, comprising:
   migrating the acquired, unstacked seismic data; and
   spatially mapping the migrated seismic data to correct their respective offsets to a lower dip while maintaining the angle of incidence to the dipping event.

2. The method of claim 1, wherein migrating the acquired seismic data comprises migrating the acquired seismic data in time.

3. The method of claim 1, wherein migrating the acquired seismic data comprises migrating the acquired seismic data in depth.

4. The method of claim 1, further comprising removing residual moveout from the migrated seismic data prior to the spatial mapping.

5. The method of claim 1, wherein spatially mapping the migrated seismic data to correct their respective offsets while maintaining the angle of incidence to the dipping event includes:
   tracing a plurality of rays from the dipping event to the acquisition geometry to determine the respective angle of incidence for the migrated seismic data; and
   applying a spatial correction to the migrated seismic data to place the migrated seismic data at a corrected offset position for the same angles of incidence with zero dip.

6. The method of claim 1, further comprising removing normal moveout from the spatially mapped seismic data.

7. A program storage medium encoded with instructions that, when executed by a computing device, perform a method for compensating acquired seismic data for the presence of dipping events, the method comprising:
   migrating the acquired, unstacked seismic data; and
   spatially mapping the migrated seismic data to correct their respective offsets while maintaining the angle of incidence to a dipping event.

8. The program storage medium of claim 7, wherein, in the encoded method, migrating the acquired seismic data comprises migrating the acquired seismic data in time.

9. The program storage medium of claim 7, wherein, in the encoded method, migrating the acquired seismic data comprises migrating the acquired seismic data in depth.

10. The program storage medium of claim 7, wherein the encoded method further comprises removing residual moveout from the migrated seismic data prior to the spatial mapping.

11. The program storage medium of claim 7, wherein, in the encoded method, spatially mapping the migrated seismic data to correct their respective offsets while maintaining the angle of incidence to the dipping event includes:

extracting the dipping event from the migrated seismic data;

tracing a plurality of rays from the extracted dipping event through the acquisition geometry to determine the respective angle of incidence for each of a plurality of original offsets; and applying a spatial correction to the migrated seismic data to place the migrated seismic data at a corrected offset position for the same angles of incidence with zero dip.

12. The program storage medium of claim 7, wherein the encoded method further comprises removing normal moveout from the spatially mapped seismic data.

13. A computing device programmed to perform a method for compensating acquired seismic data for the presence of dipping events, the method comprising:

migrating the acquired, unstacked seismic data; and spatially mapping the migrated seismic data to correct their respective offsets while maintaining the angle of incidence to a dipping event.

14. The computing device of claim 13, wherein, in the programmed method, migrating the acquired seismic data comprises migrating the acquired seismic data in time.

15. The computing device of claim 13, wherein, in the programmed method, migrating the acquired seismic data comprises migrating the acquired seismic data in depth.

16. The computing device of claim 13, wherein the programmed method further comprises removing residual moveout from the migrated seismic data prior to the spatial mapping.

17. The computing device of claim 13, wherein, in the programmed method, spatially mapping the migrated seismic data to correct their respective offsets while maintaining the angle of incidence to the dipping event includes:

extracting the dipping event from the migrated seismic data;

tracing a plurality of rays from the extracted dipping event through the acquisition geometry to determine the respective angle of incidence for each of a plurality of original offsets; and applying a spatial correction to the migrated seismic data to place the migrated seismic data at a corrected offset position for the same angles of incidence with zero dip.

18. The computing device of claim 13, wherein the programmed method further comprises removing normal moveout from the spatially mapped seismic data.

19. A method for compensating acquired seismic data for the presence of dipping events, comprising:

performing a prestack migration on the acquired seismic data; and applying a spatial correction to the migrated seismic data to place the migrated seismic data having a plurality of original offsets associated with a plurality of determined angles of incidence to a corrected offset position for the same angles of incidence with zero dip.

20. The method of claim 19, wherein performing the prestack migration includes performing the prestack migration in the time domain.

21. The method of claim 19, wherein performing the prestack migration includes performing the prestack migration in the depth domain.

22. The method of claim 19, further comprising removing residual moveout from the migrated seismic data prior to the spatial mapping.

23. The method of claim 19, wherein determining the angle of incidences associated with the original offsets includes:

extracting a dipping event from the migrated seismic data; and tracing a plurality of rays from the extracted dipping event through the acquisition geometry to determine the respective angle of incidence for each of the original offsets.

24. The method of claim 19, further comprising removing normal moveout from the spatially mapped seismic data.

* * * * *